United States Patent
Verhaak

(10) Patent No.: US 6,872,372 B1
(45) Date of Patent: Mar. 29, 2005

(54) REDUCTION OF N₂O EMISSIONS

(75) Inventor: Michael Johannes Franciscus Maria Verhaak, Alkmaar (NL)

(73) Assignee: Stichting Energieonderzoek Centrum Nederland, Le Petten (NL)

(*) Notice: Subject to any disclaimer, the term of this patent is extended or adjusted under 35 U.S.C. 154(b) by 98 days.

(21) Appl. No.: 10/070,317

(22) PCT Filed: Sep. 6, 2000

(86) PCT No.: PCT/NL00/00626

§ 371 (c)(1),
(2), (4) Date: Mar. 5, 2002

(87) PCT Pub. No.: WO01/21288

PCT Pub. Date: Mar. 29, 2001

(30) Foreign Application Priority Data

| | | |
|---|---|---|
| Sep. 6, 1999 | (NL) | 1012983 |
| Dec. 15, 1999 | (NL) | 1013862 |

(51) Int. Cl.⁷ .............. B01J 8/00; B01J 23/40; C01B 21/00
(52) U.S. Cl. .................. 423/239.2; 502/326
(58) Field of Search .................. 423/239.2; 502/326

(56) References Cited

U.S. PATENT DOCUMENTS 5,149,512 A * 9/1992 Li et al. .................. 423/239
5,524,432 A 6/1996 Hansel .................. 60/274

FOREIGN PATENT DOCUMENTS

| DE | 41 28 629 | 3/1993 |
| WO | WO 99/49954 | 10/1999 |

OTHER PUBLICATIONS

M. Kögel et al., "Simultaneous Catalytic Reduction of NO and N₂O Using Fe–MFI Prepared by Solid–State Ion Exchange," Catalysis Letters, V. 51, 1998, pp. 23–25.

* cited by examiner

Primary Examiner—Steven Bos
Assistant Examiner—Jonas N. Strickland
(74) Attorney, Agent, or Firm—Young & Thompson

(57) ABSTRACT

A method for the selective catalyst reduction of nitrous oxide ($N_2O$) in the presence of a solid catalyst, with the addition of a saturated hydrocarbon as reducing agent. The catalyst used is a promoted, iron-containing zeolite. As a result, it is possible to increase the conversion of ($N_2O$) compared to unpromoted iron-containing zeolite catalysts. The promoted catalyst is active at temperatures below 350° C. Furthermore, it has been found that the iron-containing zeolite catalysts which are promoted with precious metal also give low emissions of CO and residual hydrocarbons. The catalyst is also very active under high process pressures and in the presence of sulphur.

18 Claims, 2 Drawing Sheets

REDUCTION OF N₂O EMISSIONS

BACKGROUND

Nitrous oxide (dinitrogen oxide, $N_2O$) makes a substantial contribution to the greenhouse effect. The global warming potential (the extent to which a molecule contributes to the greenhouse effect compared to one molecule of $CO_2$) of $N_2O$ is approx. 310. For a number of years, the policy of reducing emissions of greenhouse gases has been developed. The present invention can make a significant contribution to this policy. Various significant sources of $N_2O$ emissions have been identified: agriculture, industrial production of nylon precursors (adipic acid and caprolactam), the production of nitric acid and motor vehicles fitted with a three-way catalyst.

In principle, various catalytic and non-catalytic techniques can be employed in order to render nitrous oxide harmless. Various catalysts are known for the direct catalytic decomposition of $N_2O$ to $N_2$ and $O_3$ (cf. the literature summary provided by Kapteijn et al., Appl. Catal. B9 (1996), pp 25–64 and U.S. Pat. No. 5,171,553). However, this reaction is hampered to a considerable extent by the presence of oxygen and water, which are to be found in the off-gases from virtually all the $N_2$sources listed above. Selective catalytic reduction is a promising alternative. Various catalysts for the conversion of $N_2O$ with the aid of olefins ($C_nH_{2n}$), alcohols or ammonia have been studied in the literature (recently: Mauzevin et al. Appl. Catal. B23 (1999) L79-L82 and Pophal et al. Appl. Catal. B16 (1998) pp. 177–186 and the literature cited therein ). Catalysts employed are often zeolites which have been substituted with a transition metal, such as iron, cobalt or copper.

For both technical and economic reasons, the addition of saturated hydrocarbons ($C_nH_{2n+2}$) would be preferable to the abovementioned reducing agents. Natural gas ($CH_4$) and LPG (mixture of $C_3H_8$ and $C_4H_{10}$) are particularly attractive in this context. It is important that the formation and emission of carbon monoxoide (CO) and emission of unreacted hydrocarbons be minimized.

The present invention relates to a catalyst which enables $N_2O$ to be converted into nitrogen at a relatively low temperature and which allows very low emissions of CO and hydrocarbons to be achieved.

PRIOR ART

International Patent Application WO 9949954 has described a method for the catalytic reduction of $N_2O$ in the presence of a zeolite with the addition of a reducing agent, the reducing agent used being a saturated hydrocarbon, such a methane ($CH_4$), propane ($C_3H_8$), LPG ($C_3H_8/C_4H_{10}$), or a combination of these reduction agents. It has been found that complete conversion of $N_2O$ can be achieved at reaction temperatures of 400° C. or lower, even with very low concentrations of the reducing agent and in the presence of water vapour, oxygen and sulphur dioxide. The catalyst involves a specially prepared iron-substituted zeolite.

Japanese patent publications JP 05103953 and JP 07213864 describe the removal of $N_2O$ in the presence of, respectively, methane and propane with the aid of (inter alia) and iron-zeolite catalyst. However, these methods take no account of the emission of CO and unreacted hydrocarbons.

To prevent undesirable emission of CO and residual hydrocarbons, Japanese patent publication JP 09000884 described the mechanical mixing of an iron-zeolite catalyst with a supported platinum or palladium catalyst. The $N_2O$ conversion is around 60% at 450° C. in a gas which contains oxygen and water. The conversion of $N_2O$ achieved with the mechanically mixed catalyst is significantly worse than with the iron-zeolite catalyst alone.

JP 05103953, JP 07213864 and JP 09000884 all lack information about the effectiveness of the invention under pressure and/or in the presence of sulphur compounds. This is essential for use in the production of nitric acid and caprolactam, respectively.

DISCOVERY OF A NOVEL CATALYST

One object of the present invention is to provide a method for the removal of $N_2O$ from industrial gas streams which contain $O_2$, $H_2O$, $NO_x$ and possibly sulphur and which may be at elevated pressure. A further object of the present invention is to bring about the abovementioned removal of $N_2O$ by the addition of saturated hydrocarbons at a reaction temperature of lower than 400° C., with very low emissions of CO and unreacted hydrocarbons.

To this end, the method according to the invention is characterized in that the catalyst used is a promoted, iron-containing zeolite. The zeolite catalyst is preferably promoted with a precious metal.

The use of an iron-containing zeolite catalyst which has been promoted preferably with precious metal (Rh, Pd, Ru, Pt, Au, etc.) in the SCR of $N_2O$ with the aid of saturated hydrocarbons ($C_nH_{2n+2}$) has surprisingly led to increased conversion of $N_2O$ compared to an unpromoted iron-containing zeolite catalyst. The promoted catalyst is active at temperatures of below 350° C.

Furthermore, it has been found that the iron-containing zeolite catalyst which has been promoted with precious metal reduces the emissions of CO and residual. hydrocarbons very considerably at the operating temperature compared to an unpromoted iron-containing zeolite catalyst.

In addition, it has been found that the catalyst according to the invention is also active in the removal of nitrogen oxides ($NO+NO_2=NO_x$). This is important in view of the fact that $NO_x$ are also released from the various sources of $N_2O$.

It has also been found that the catalyst described is also very active in the desired conversion at elevated process pressure, at which it is even more active than at atmospheric pressure. This is an important fact with regard to its application in the nitric acid industry.

Finally, it has been found that the catalyst described is active if sulphur is present in the feed. This is an important fact in connection with its application in the nylon industry.

BRIEF DESCRIPTION OF THE DRAWINGS

The invention will be explained in more detail with reference to the following examples together with the associated figures, in which.

I. Preparation of the Catalysts

Figure 1:
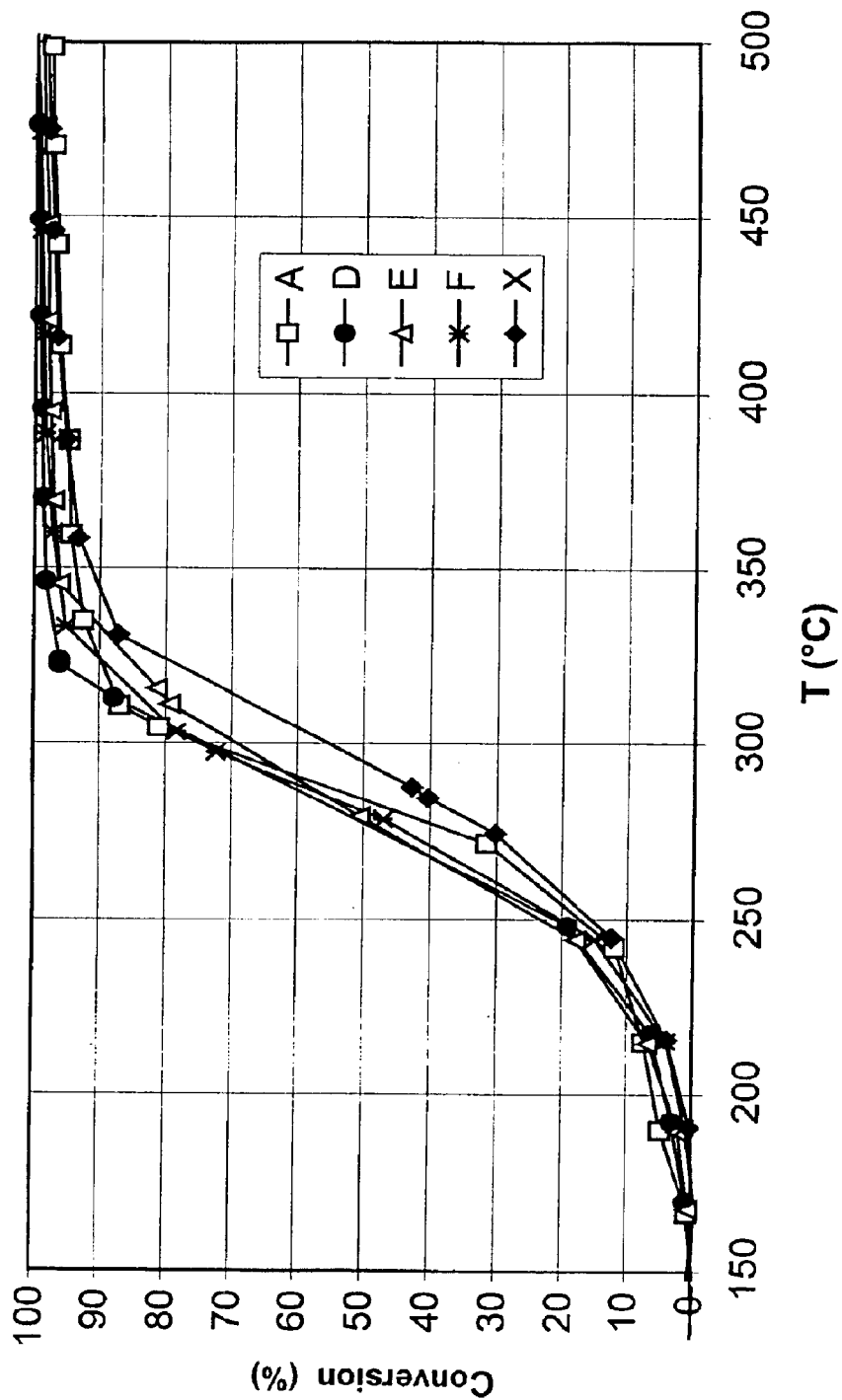
FIG. 1 shows the degree of conversion of $N_2O$ as a function of temperature for four iron-containing zeolite catalysts promoted with precious metal (A, D, E and F). For comparison purposes, the $N_2O$ conversion achieved by an unpromoted iron-containing zeolite catalyst (X) is also shown. The test conditions are described in Table 2 (SV= 19,500 $h^{-1}$, pressure=3 bara, $C_3H_8$ concentration=1900 ppmv).

The catalysts according to the present invention are produced by adding zeolite Na-ZSM-5 or $NH_4$-ZSM-5 to a solution of $(NH_4)_2Fe(SO_4)_2 \cdot 6H_2O$ (Mohr's salt). After they have been combined, ion exchange is carried out for 8 hours at 80° C. The resulting suspension is filtered, the solid material is washed, is dried at 80° C. and is calcined at 550° C.

The Fe-ZSM-5 base material obtained in this way is then impregnated with a volume of a solution of a precious metal precursor in demineralized water which is such that the pores of the base material are precisely filled (so-called incipient wetness impregnation). The concentration of the precious metal precursor is set in such a manner that the desired quantity of precious metal on the base material is obtained. Finally, the catalyst is dried at 80° C. and calcined at 550° C. The catalyst powder obtained is pressed into a tablet, is ground and is screened.

The following catalysts are used in the examples:

TABLE 1

| Catalyst | Base | Precious metal |
|---|---|---|
| A | Fe-ZSM-5 from Mohr's salt | 0.05% Pd |
| B | Fe-ZSM-5 from Mohr's salt | 0.1% Pd |
| C | Fe-ZSM-5 from Mohr's salt | 0.3% Pd |
| D | Fe-ZSM-5 from Mohr's salt | 0.3% Rh |
| E | Fe-ZSM-5 from Mohr's salt | 0.3% Rn |
| F | Fe-ZSM-5 from Mohr's salt | 0.3% Au |
| X | Fe-ZSM-5 from Mohr's salt | none |

II. Test Apparatus

The conversion of $N_2O$ by means of SCR using propane and methane was studied in an automated flow arrangement. The gases $N_2$, air, $N_2O$, $C_3H_8$, $CH_4$, NO, $NO_2$ are introduced by means of calibrated mass flow controllers (Brooks). Water is added via a Liquiflow controller and a controlled Evaporator Mixer (Bronkhorst). The gases emerging are analysed by means of a calibrated FTIR spectrophotometer (Elsag. Bailey, Hartmann & Brown, type MB 100). The catalyst is in a stainless steel reactor. The gases are passed through a preheating section before they come into contact with the catalyst. The temperature at the entry to and exit from the catalyst bed is measured using thermocouples. The mean of these two temperatures is shown in the results of the tests. The pressure in the test arrangement can be set at levels of between 1 and 5 bar absolute (bara).

The gas composition in the examples is representative for use of the catalyst according to the present invention in the nitric acid industry. The general test conditions are as follows:

TABLE 2

| | |
|---|---|
| Weight of catalyst | 6–15 g |
| Screening fraction | 0.71–1.4 mm |
| Volume of catalyst | 10–23 ml |
| Total gas flow rate | 5–7.5 l/min (STP) |
| Space velocity | 13,000–45,000 $h^{-1}$ |
| Total pressure | 1–5 bara |
| Temperature of catalyst | 150–500° C. |
| $O_2$ concentration | 2.5% v/v |
| $H_2O$ concentration | 0.5% v/v |
| $N_2O$ concentration | 1500 ppmv |
| $C_3H_8$ concentration | 1500–2500 ppmv |
| $NO_2$ concentration | 100 ppmv |
| NO concentration | 100 ppmv |

III. Influence of the Addition of Precious Metal to Iron-containing Zeolite

FIG. 1 shows the $N_2O$ conversion for the catalyst from Table 1 (test conditions as in Table 2, SV=19,500 $h^{-1}$, pressure=3 bara, $C_3H_8$ concentration=1900 ppmv). The promoted catalyst (A,D,B,F) are more active than the unpromoted iron-containing zeolite catalyst X. This is evident from the shift of the $N_2O$ conversion curves towards a lower temperature compared to the unpromoted Fe-ZSM-5 catalyst X.

Figure 2:
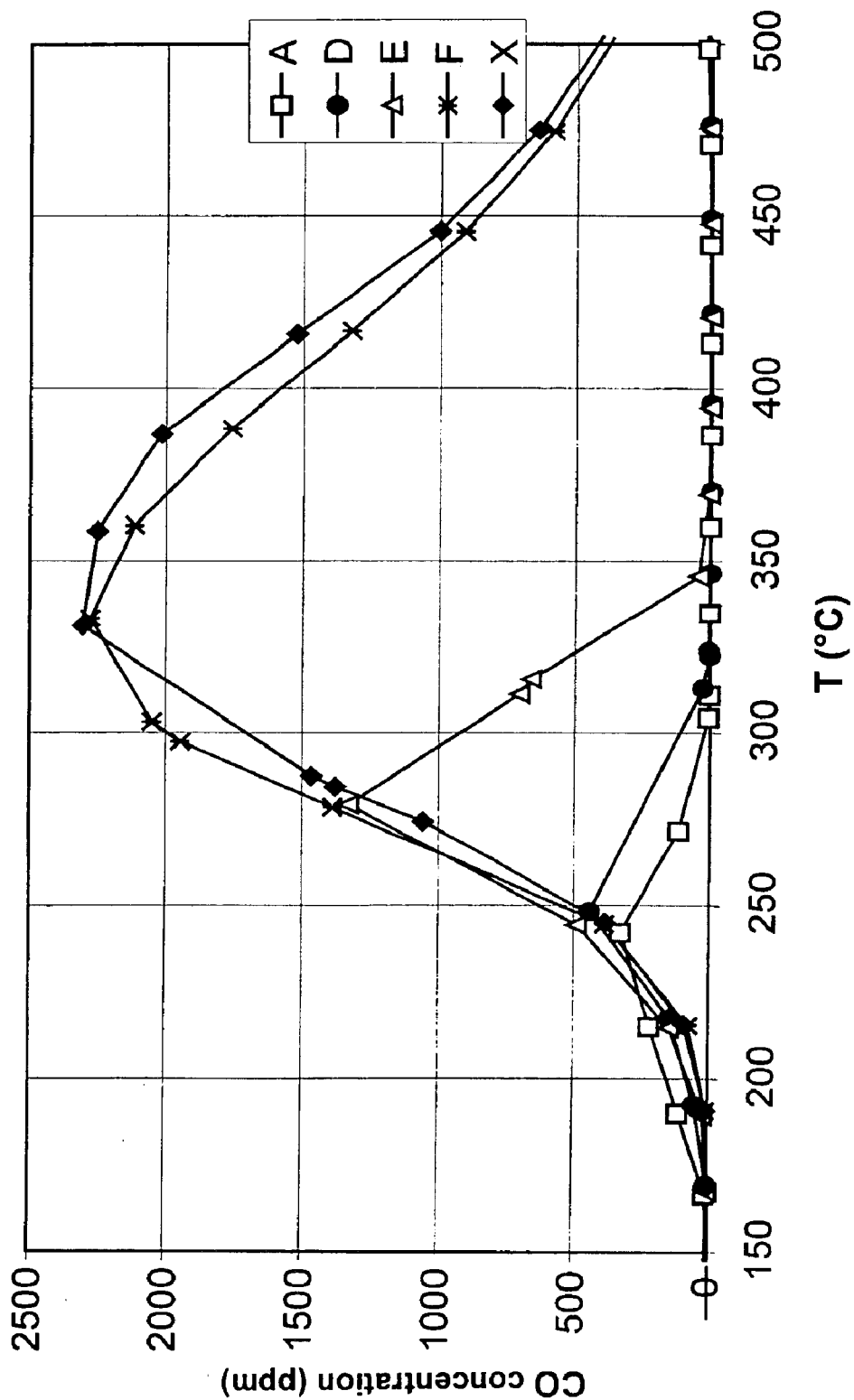
FIG. 2 shows the CO emissions which occur during the conversion of $N_2O$ using the same catalysts and under the same conditions as in FIG. 1.

FIG. 2 shows the CO concentrations as a function of temperature for the same catalysts under the same conditions. When using catalyst X and catalysts F, CO is formed throughout the entire temperature range. The other catalyst are excellent at eliminating CO emissions: if catalyst E is used, the amount of CO at over 350° C. is lower than 10 ppmv, and with catalysts A and D this level is already achieved form 300° C.

Comparative tests between catalyst A (containing 0.05% Pd) and catalysts B and C (respectively containing 0.1% and 0.3% Pd) reveal similar curves for both $N_2O$ conversion and CO formation. This means that a low concentration of precious metal is sufficient, reducing the cost of the catalyst.

Table 3 shows the concentrations of the compounds which leave the reactor at a mean temperature of 350° C. for a number of catalysts (test conditions as in Table 2, SV=19,500 $h^{-1}$, pressure=3 bara, $C_3H_8$ concentration=1900 ppmv).

TABLE 3

| Catalyst | $N_2O$ (ppmv) | $C_3H_8$ (ppmv) | CO (ppmv) | $NO_x$[a] (ppmv) |
|---|---|---|---|---|
| C | 70 | 62 | 3 | 85 |
| D | 55 | 33 | 1 | 85 |
| E | 130 | 75 | 37 | 82 |
| F | 42 | 70 | 2180 | 45 |
| X | 123 | 167 | 2267 | 46 |

[a]$NO_x$ = NO + $NO_2$

For all the catalysts, the $N_2O$ and $C_3H_8$ conversion levels are higher than 90% at 350° C. For the catalysts which contain Pd and Rh, the CO emission is negligible. Another surprise is that the catalysts also remove from 60 to 75% of the $NO_x$.

IV. Activity of the Promoted Iron-containing Zeolite Catalysts at Increased Process Pressure and Space Velocity Increasing the process pressure has a beneficial affect on the activity of the catalysts. Table 4 shows the concentrations of a number of components of the emerging gas, at 1, 3 and 5 bara and at a reaction temperature of 350° C. (test conditions as in Table 2, catalyst A, SV=19,500 $h^{-1}$, $C_3H_8$ concentration=1900 ppmv). The $N_2O$ conversion level remains greater than 90%, while propane slippage, CO and $NO_x$ emissions fall as the process pressure rises.

TABLE 4

| Pressure (bara) | $N_2O$ (ppmv) | $C_3H_8$ (ppmv) | CO (ppmv) | $NO_x$[a] (ppmv) |
|---|---|---|---|---|
| 1 | 95 | 200 | 14 | 137 |
| 3 | 128 | 124 | 3 | 135 |
| 5 | 100 | 54 | 2 | 122 |

[a]$NO_x$ = NO + $NO_2$

At a process pressure of 4 bara and under conditions as in Table 2 (catalyst A, SV=13,000 h$^{-1}$), increased activity was measured when the propane concentration was increased from 1500 to 2000 ppmv. Further increasing the propane/$N_2O$ ratio had no further positive effect on the conversion of $N_2O$.

Experiments under conditions as in Table 2 (catalyst A, pressure=4 bara, $C_3H_8$ concentration=1900 ppmv) indicate that the space velocity can be increased from 13,000 to 45,000 h$^{-1}$ without the activity of the catalyst being adversely affected.

The stability of the catalyst is tested for 50 hours in the conditions as described in Table 2. No deterioration in the activity was detected.

V. $N_2O$ Conversion in Different Gas Compositions

Table 5 demonstrates that the catalyst according to the present invention also functions well with higher water concentrations and higher oxygen concentrations. The table describes experiments in different gas compositions (conditions as in Table 2, catalyst B, SV=13,000 h$^{-1}$, no NO and $NO_2$ present)

TABLE 5

| Feed | | | | Reaction T = 350° C. | |
|---|---|---|---|---|---|
| $N_2O$ (ppmv) | $C_3H_8$ (ppmv) | $O_2$ (% v/v) | $H_2O$ (% v/v) | $N_2O$-conversion | CO (ppmv) |
| 500 | 1000 | 6 | 0.5 | 97% | 3 |
| 500 | 1000 | 3 | 0.5 | 97% | 2 |
| 500 | 1000 | 2 | 0.5 | 84% | 3 |
| 1000 | 1000 | 2 | 0.5 | 90% | 2 |
| 1000 | 500 | 2 | 0.5 | 82% | 2 |
| 500 | 1000 | 6 | 2 | 94% | 2 |
| 1000[a] | 1000 | 2 | 0.5 | 73%[a] | 1[a] |

[a]In the presence of 250 ppmv NO

The catalyst X was tested in the presence of $SO_2$ (500 ppmv $N_2O$, 500 ppmv $C_3H_8$, 6% $H_2O$, 500 ppmv NO, 160 ppmv $SO_2$, SV=6000 h$^{-1}$, T=400–460° C.). The catalyst is able to withstand sulphur; no deactivation was detected over a period of 550 hours under the above conditions.

What is claimed is:

1. Method for the selective catalytic reduction of nitrous oxide ($N_2O$) in the presence of a solid catalyst, with the addition of a saturated hydrocarbon as a reducing agent, wherein the catalyst used is an iron-containing zeolite promoted with at least one precious metal selected from the group consisting of ruthenium, rhodium, palladium and gold; the catalyst thereby comprising a zeolite which contains at least one combination of metals selected from the group consisting of iron and ruthenium, iron and rhodium, iron and palladium and iron and gold, for the catalytic reduction of nitrous oxide.

2. The method according to claim 1, wherein the catalyst is promoted with a combination of two or more precious metals selected from the group consisting of ruthenium, rhodium, palladium and gold.

3. The method according to claim 1, wherein the reducing agent used is natural gas or methane ($CH_4$) or propane ($C_3H_8$) or LPG ($C_3H_8/C_4H_{10}$).

4. The method according to claim 3, wherein a combination of reducing agents is used.

5. The method according to claim 1, wherein the concentration of the reducing agent is set in such a way that the hydrocarbon/$N_2O$ molar ratio is in the range from 0.2 to 20.

6. The method according to claim 5, wherein the molar ratio of hydrocarbon to $N_2O$ ranges from 0.5 to 5.

7. The method according to claim 1, wherein the reduction takes place at an inlet temperature of less than 400° C.

8. The method according to claim 1, wherein the reduction results in an emission of carbon monoxide (CO) and of hydrocarbon, which is in each case separately less than 100 ppmv.

9. The method according to claim 1, wherein the reduction takes place at a pressure between 1 and 50 bar absolute.

10. Method for the selective catalytic reduction of nitrous oxide ($N_2O$) from an industrial gas stream containing $N_2O$, $O_2$, $H_2O$, $NO_x$ and optionally sulfur, which comprises:

providing a catalyst comprising an iron-containing zeolite promoted with at least one precious metal selected from the group consisting of ruthenium, rhodium, palladium and gold; the catalyst thereby comprising a zeolite which contains at least one combination of metals selected from the group consisting of iron and ruthenium, iron and rhodium, iron and palladium and iron and gold; and contacting the gas stream with the catalyst in the presence of a saturated hydrocarbon as a reducing agent for the catalytic reduction of nitrous oxide.

11. The method according to claim 10, wherein the catalyst is promoted with a combination of two or more precious metals selected from the group consisting of ruthenium, rhodium, palladium and gold.

12. The method according to claim 10, wherein the reduction agent used is natural gas or methane ($CH_4$) or propane ($C_3H_8$) or LPG ($C_3H_8/C_4H_{10}$).

13. The method according to claim 12, wherein a combination of reducing agents is used.

14. The method according to claim 10, wherein the concentration of the reducing agent is set in such a way that the hydrocarbon/$N_2O$ molar ratio is in the range from 0.2 to 20.

15. The method according to claim 14, wherein the molar ratio of hydrocarbon to $N_2O$ ranges from 0.5 to 5.

16. The method according to claim 10, wherein the reduction takes place at an inlet temperatures of less than 400° C.

17. The method according to claim 10, wherein the reduction results in an emission of carbon monoxide (CO) and of hydrocarbon, which is in each case separately less than 100 ppmv.

18. The method according to claim 10, wherein the reduction takes place at a pressure between 1 and 50 bar absolute.

* * * * *